United States Patent [19]

Driscoll

[11] Patent Number: 5,328,312

[45] Date of Patent: Jul. 12, 1994

[54] DUAL LOAD-PATH FASTENER

[75] Inventor: Timothy D. Driscoll, Mountain View, Calif.

[73] Assignee: Space Systems/Loral, Inc., Palo Alto, Calif.

[21] Appl. No.: 994,790

[22] Filed: Dec. 22, 1992

[51] Int. Cl.$^5$ .............................................. F16B 35/00
[52] U.S. Cl. ..................................... 411/366; 411/383; 403/408.1
[58] Field of Search ...................... 411/383, 2, 3, 4, 5, 411/263, 292, 214, 338, 366, 385, 390, 395; 403/11, 21, 408.1

[56] References Cited

U.S. PATENT DOCUMENTS

| | | | |
|---|---|---|---|
| 2,359,046 | 9/1944 | Miller | 411/395 X |
| 4,435,100 | 3/1984 | Cox | 411/366 X |

FOREIGN PATENT DOCUMENTS

| | | | |
|---|---|---|---|
| 393661 | 4/1924 | Fed. Rep. of Germany | 411/214 |
| 653437 | 3/1979 | U.S.S.R. | 403/408.1 |

Primary Examiner—Rodney M. Lindsey
Attorney, Agent, or Firm—Perman & Green

[57] ABSTRACT

A fastener system is provided for securing a component to supporting structure. The fastener system comprises a pair of cooperating fastener modules. The first module includes a first stationary member attached to the supporting structure and a first bolt member threadedly engaged with the first stationary member. The second module includes a second stationary member also attached to the supporting structure and a second bolt member threadedly engaged with the second stationary member. The second bolt member also extends freely through a longitudinal bore in the first bolt member. Head members on the first and second head members are mutually engaged for their unitary rotation and the first head member engages the component. When the head members are rotated in one direction, they are advanced toward the supporting structure thereby drawing the component toward the supporting structure. Rotation in the opposite direction is effective to cause the head members to retract from the supporting structure and thereby separate the component from the supporting structure. With this construction, upon fracture either of the first fastener means at a location away from the first head member or of the second fastener means at a location away from the second head member, upon rotation of the first head member in the one direction, the first head member nevertheless continues to advance toward the supporting structure.

14 Claims, 5 Drawing Sheets

5,328,312

DUAL LOAD-PATH FASTENER

This invention herein is a "subject invention" under NASA Contract No. NAS-25082. Subcontract No. R80SIA88561105.

BACKGROUND OF THE INVENTION

1. Field of the Invention

This invention relates generally to fasteners and more particularly to a fastener constructions which provide redundant load paths for fail-safe operation.

2. Description of the Prior Art

There has long been a need for a fastener of simplified construction which would continue to operate in the event of a failure of a constituent part. This need has been intensified by the space program in the course of which components are being designed which must be joined in space without the conveniences available on earth. For example, in the space environment, it is not easy, and is sometimes impossible, to remove and replace a failed fastener. Additionally, such tasks are intended to be performed primarily by robots which lack the ability of human beings to readily detect a failure and react in a proper fashion to assess the situation and determine a course of action.

Known to the prior art, for example, are lock nut assemblies of the nature disclosed in U.S. Pat. Nos. 4,889,458 to Taylor and No. 4,840,529 to Phillips. These utilize coaxial fastening members which are threadedly engageable. A similar construction disclosed in U.S. Pat. No. 4,863,329 to Wilson has been utilized for resiliently component so as to isolate the component from vibration. Another similar known construction, as disclosed in U.S. Pat. No. 4,925,364 to Das, provides an adjustable spacer for maintaining a minimum of separation between two translating members as, for example, in a gas turbine engine.

However, none of these constructions, although generally of a coaxial design, provide dual load paths in the event of a failure of one of the coaxial elements. It was with knowledge of the prior art and the limitations existing in such prior art devices that the present invention has been conceived and is now reduced to practice.

SUMMARY OF THE INVENTION

The present invention, therefore, relates to a fail-safe fastener system provided for securing a component to supporting structure. The fastener system comprises a pair of cooperating fastener modules. The first module includes a first stationary member attached to the supporting structure and a outer bolt member threadedly engaged with the first stationary member. The second module includes a second stationary member also attached to the supporting structure and a second bolt member threadedly engaged with the second stationary member. The second bolt member also extends freely through a longitudinal bore in the outer bolt member. Head members on the first and second head members are mutually engaged for their unitary rotation and the first head member engages the component. When the head members are rotated in one direction, they are advanced toward the supporting structure thereby drawing the component toward the supporting structure. Rotation in the opposite direction is effective to cause the head members to retract from the supporting structure and thereby separate the component from the supporting structure. With this construction, upon fracture either of the first fastener means at a location away from the first head member or of the second fastener means at a location away from the second head member, upon rotation of the first head member in the one direction, the first head member nevertheless continues to advance toward the supporting structure.

A principal object of this invention, therefore, is to provide a fail-safe fastener of simplified construction which can be readily applied or removed with minimal effort.

Another object of the invention is to provide such a fastener which can be operated upon without difficulty by a robot device.

A further object of the invention is to provide a fastener having dual load paths such that upon the failure of one of the load paths, a surviving load path will continue to operate.

Yet another object of the invention is to provide such a fastener which can be readily applied to existing fastening sites on a supporting structure as, for example, on the exterior of a space station.

As still further objects, the fastener of the invention is simple and rugged in construction, is relatively inexpensive to manufacture, can be readily assembled, and utilizes commonly available materials in its construction.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

Figure 1:
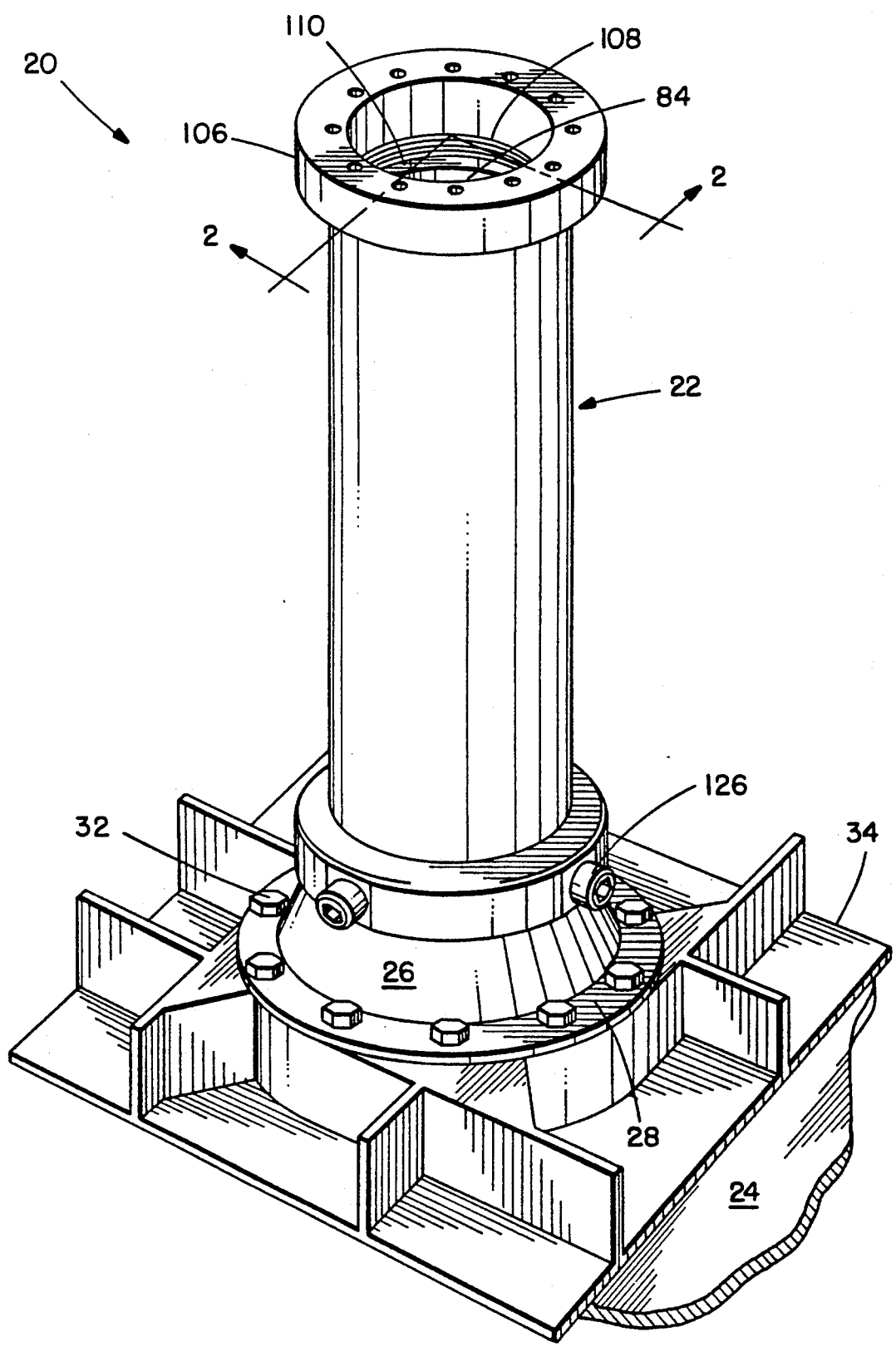
FIG. 1 is a perspective view of a component attached to supporting structure by means of a fastener system embodying the present invention.

Turn now to the drawings and, initially, to FIG. 1 which generally illustrates the invention in operation. Specifically, the fastener system 20 is illustrated being employed to secure a component 22, such as a load tube to supporting structure 24 which may be, for example, an outer attachment wall of a space station. The component 22 may have a flared skirt 26 terminating at a ring 28 provided with a plurality of spaced attachment holes 30 circumferentially spaced to receive suitable mounting bolts 32 for attachment to a floor panel 34 of another structure to be attached to the supporting structure 24. The load tube 22 is the focus of all the axial loads experienced by the supporting structure 24. The load tube is in tension from the top (at the flanged upper end 106) and in compression from the bottom (at the flanged shirt 26). This tension/compression combination continues the required redundant load-path into the supporting structure 24 for distribution.

Figure 2:
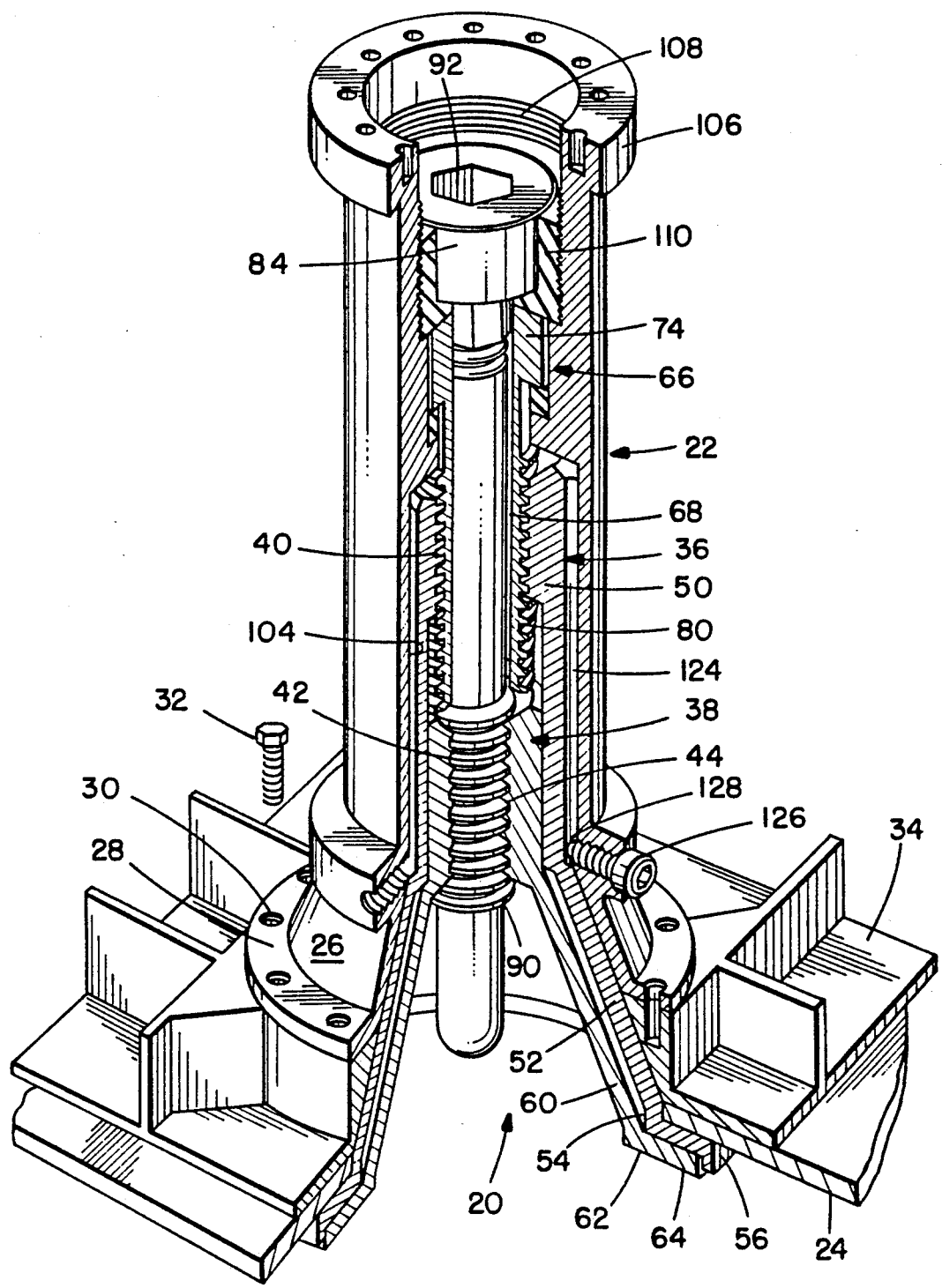
FIG. 2 is a perspective view, similar to FIG. 1, partly cut away to show the parts thereof in section.
Figure 3:
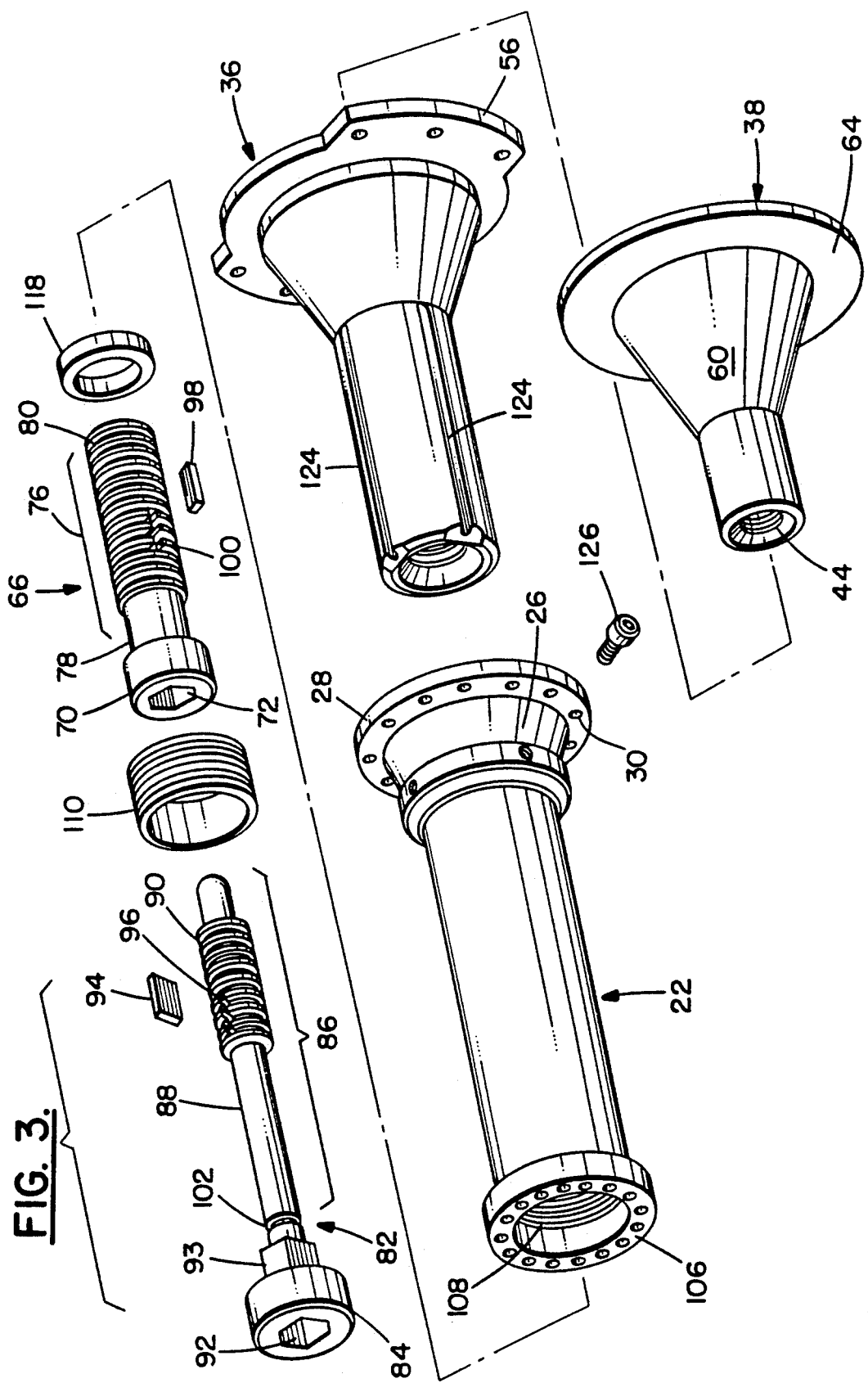
FIG. 3 is a perspective exploded view to illustrate many of the parts illustrated in FIGS. 1 and 2.
Figure 4:
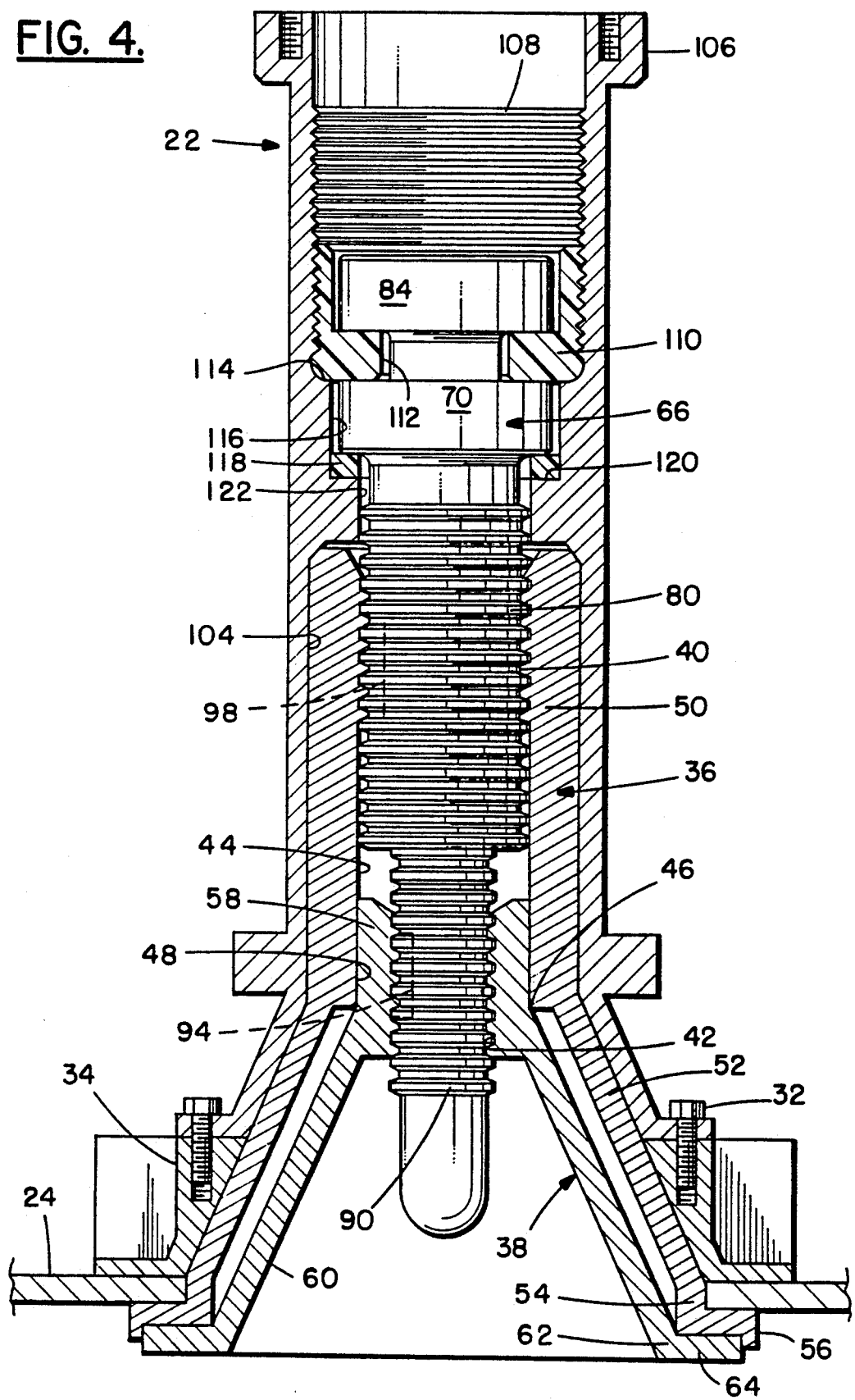
FIG. 4 is an elevation view, in section, of the construction illustrated in FIGS. 1 and 2.
Figure 5:
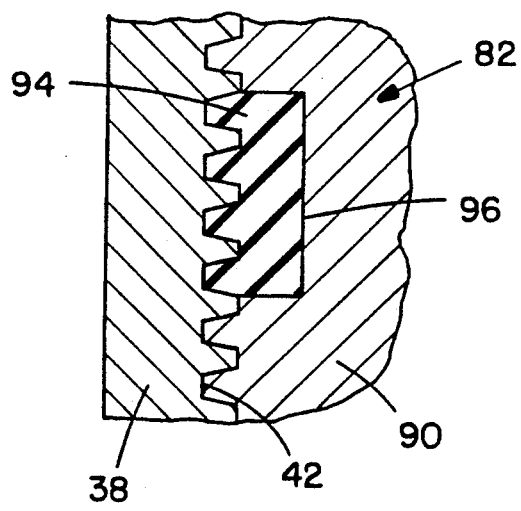
FIGS. 5 and 6 are detail cross section views, in elevation, illustrating parts depicted in FIGS. 3 and 4.
Figure 6:
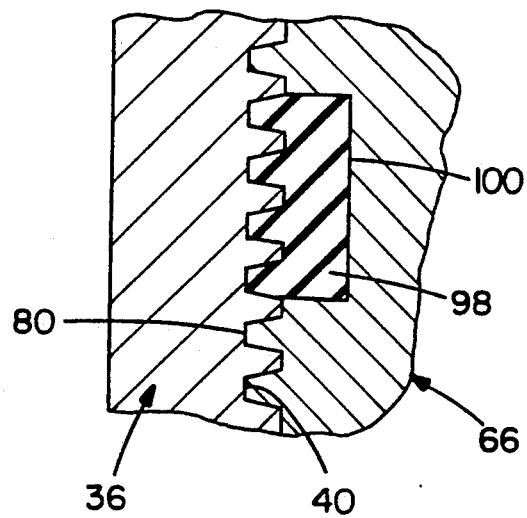

Turning now to FIGS. 2–4, the fastener system 20 includes a pair of stationary spindle members 36, 38, the former being an outer spindle member and the latter being an inner spindle member. The spindle members 36, 38 are elongated and partly cylindrical and each has a longitudinally extending threaded bore. A threaded bore for the outer spindle member 36 is indicated by reference numeral 40 and the threaded bore for the inner spindle member 38 is indicated by reference numeral 42.

The outer spindle member 36 also has a smooth counterbore 44 for slidable reception of the cylindrical part of the inner spindle member 38 until an end 46 of a shirt member 60 engages annular shoulder 48 of the outer spindle member 36.

With continued reference to FIGS. 2 and 4, it will be appreciated that the threaded bore 40 and the counterbore 44 of the outer spindle member 36 are both formed in a cylindrical element 50 which extends to a conical skirt member 52 which leads away from the cylindrical element 50 to a terminal rim 54. Integral with the terminal rim is an annular flange 56 which is suitably attached, as by welding, bolts, or other suitable fasteners, to the supporting structure 24. In similar fashion, the threaded bore 42. is at least partially formed in a cylindrical element 58 of the inner spindle member 38. Another conical skirt member 60 is integral with and extends away from the cylindrical element 58 to a terminal rim 62. An annular flange 64 is integral with the terminal rim 62 and is suitably attached to the annular flange 56 as by bolt, welding, or other suitable attachment means.

The skirt members 52, 60 are generally parallel to one another and coextensive. A outer bolt 66 which also has a longitudinal axis coaxial with the outer and inner spindle members 36, 38, is formed with a longitudinally extending, smooth, throughbore 68 that includes a first head 70 having a multifaceted recess 72.

The outer bolt 66 includes a head member 74 and an integral shank 76 which extends away from the head member. The shank may have a smooth outer surface 78 for a portion of its length, then for the remainder of its length be threaded, as at 80, formed with acme-type threads thereon. The threaded shank 80 is threadedly engaged with the threaded bore 40 of the cylindrical element 50 of the outer spindle member 36.

An inner bolt 82 includes a head member 84 and a shank 86. A portion of the shank is smooth and cylindrical as at 88 and a portion, as at 90, is externally threaded with acme-type threads thereon. The shank 86 extends freely through the throughbore 68 of the outer bolt 66. The threaded portion 90 is threadedly engaged with the threaded bore 42 within the cylindrical element 58 of the inner spindle member 38.

The head member 84 is formed with a multifaceted recess 92 which may be a socket for an allen-type wrench. Immediately adjacent the head member 84 is a multifaceted driver 93 which is receivable within the similarly sized and shaped recess 72 in the head member 74 of the outer bolt 66.

A deformable locking insert 94 may be fittingly received in a longitudinally directed slot 96 formed in the threaded portion 90. The locking insert serves to engage the threads 42 of the spindle member 36 so as to lock the inner bolt 82 against further unintended rotation relative to the spindle member 38 when the inner bolt 82 has reached its final position in a manner to be described.

In similar fashion, a deformable locking insert 98 which may be of a suitable material such as DELRIN ® may be fittingly received in a longitudinally extending slot 100 formed in the threaded portion 80 of the outer bolt 66. In this instance, the locking insert 98 becomes engaged with the threads 40 of the outer spindle member 36 so as to likewise lock the outer bolt 66 against relative rotation with the outer spindle member 36 when a final tightened position of the outer bolt will have been reached as will be described below.

An annular recess 102 having a predetermined diameter may be formed on the portion 88 of the inner bolt 82 adjacent the driver 93. Being of a known diameter, the annular recess 102 defines a fracture point in the shank 86 which will fracture when the torsional or launch loads on the inner bolt 82 reach a predetermined magnitude. The annular recess 102 is an optional feature and not a required one for purposes of the invention. It is desirable for the reason that it serves to inform an operator at a remote location that, indeed, a fracture has taken place in the event torsional or launch loads greater than that of the predetermined magnitude have been experienced.

Although the torsion applied to the bolt is the most likely cause for failure, it is not the only reason for providing a second load path. Orbital Replacement Units (ORU's) for a space station will experience extreme stress levels during launch. This is due to a combination of inertia loads (acceleration) and vibration from acoustic noise levels. The component 22 is an ORU which is attached to the space station with one bolt. This will minimize time needed to replace the unit in the event of an electrical failure on orbit, an important factor, since extended time outside the habitation modules increases the risk for the astronauts. If perhaps this single bolt failed during launch, it could damage the shuttle and force an abort. As strong as this single bolt can be, it still could have an undetectable flaw. The second, undamaged, bolt provides the backup load path should a failure occur.

Second to the above failure is a torsional failure which is a failure occurring during removal torque on orbit which would possibly occur while trying to remove a failed electrical component 22. Without a redundant bolt, removal would be difficult, if not impossible. Electrical connectors in the floor panel 34 of the component 22 are engaged with the space station. The second bolt provides the necessary jacking capability to force the connectors apart during replacement of the component 22.

The component 22 may be cylindrical, as illustrated, or may be of any other suitable shape but, in all events, would be formed with a longitudinal bore 104 sized and shaped to receive the fastener system 20 of the invention. Spaced from a flange upper end 106, the component 22 may be threaded as at 108 for threaded reception of a thrust collar 110 which is cup shaped to loosely receive the head member 84 of the inner bolt 82 and formed with an axial aperture 112 to freely receive that part of the driver 93 which is not engaged with the recess 72. The thrust collar 110 becomes engaged with an annular shoulder 114 defined by a counter bore 116 formed in the interior of the component 22. In a similar fashion, a ring-shaped seat 118 may be provided engageable with an annular shoulder 120 defined by a counter bore 122 also formed in the interior of the component 22. Both the thrust collar 110 and the seat 118 are optional for purposes of the invention but may be desirable to prevent galling of the annular shoulders 114, 120 and also for shimming purposes. In this latter regard, lead and pitch position can be adjusted on inner bolt 82 relative to outer bolt 66.

With the construction of the invention now substantially described, its operation will be explained.

It was previously mentioned that the spindle members 36, 38 are mounted to supporting structure 24 which may be, for example, an outer wall of a space station. The cylindrical elements 50, 58 of the spindle members 36, 38, respectively, extend outwardly from the supporting structure 24, available to receive thereon for eventual attachment the floor panel 34 and the component 22, in that order. In all likelihood, the floor panel 34 will have been attached to the ring 28 of the component 22 by means of the bolts 32 prior to placement of the assembly on the spindles 36, 38. With the spindles 36, 38 received within the longitudinal bore 104 and the flared skirt 26 of the component 22 engaged with the skirt member 52 of the outer spindle member 36, the assembly comprised of the outer and inner bolts 66, 82, respectively, is then attached. Tightening of the fastener system 20, as previously mentioned, may be performed by a robot tool operating an allen-type wrench operably received in the recess 92 of the inner bolt 82. By reason of the drive coupling between the inner and outer bolts afforded by the engagement of the driver 93 with the recess 72 in the head 70 of the outer bolt 66, rotation imparted to the inner bolt 82 is simultaneously imparted to the outer bolt 66. It will be appreciated that the threads 80 on the outer bolt 66 and the threads 90 on the inner bolt are of the same lead and pitch notwithstanding their different diameters to assure that they will advance as a unit.

With continued rotation of the head member 84 in the tightening direction, the assembly comprised of the outer and inner bolts 66, 82, respectively, will move in the direction of the supporting structure 24. The head member 74 of the outer bolt 66 imparts a force on the annular shoulder 120 of the component 22 and, simultaneously, the head member 84, acting through the thrust collar 110, imparts a force against the annular shoulder 114 of the component 22. The tightening operation continues until the skirt 26 is firmly and immovably engaged with the skirt member 52 of the outer spindle member 36. By reason of the deformable locking inserts 94, 98, once tightened, the fastener system 20 cannot reasonably become loosened without an intentional effort to that end.

In order to prevent relative rotation between component 22 and the outer spindle 36, a plurality of longitudinally extending and circumferentially spaced keyways 124 are provided in the outer surface of the outer spindle member 36. A similar number of keying screws which are similarly spaced, circumferentially, are threadedly engaged with the component 22 adjacent the skirt 26 and have tip ends 128 which are slidably engaged with the keyways 124. In this manner, the relative azimuthal position of the component 22 is relative to the outer spindle member 36 is maintained as the component is first applied to the spindle members, then advanced to its final mounted position. In the event of a fracture of the inner bolt 82, either at the annular recess 102, which is most likely, or at any other location along the shank 86 and below the driver 93, tightening can proceed through the load path including the head member 74, the threads 80, and the threads 40 on the outer spindle member 36. In the alternative, should the outer bolt 66 fracture at any location below the head member 74, continued rotation of the head member 84 is effective, through the load path provided by the threads 90 and the threads 42 on the inner spindle member to draw the component 22 to its final tightened position.

In either of these events, by rotating the head member 84 in the opposite direction, the fastener system can be loosened and, eventually, fully withdrawn to allow removal of the component 22 and of the floor panel 34 from the spindle members 36, 38.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A fastener for securing to supporting structure a component having an attachment bore extending therethrough, said fastener comprising:

first spindle means having a longitudinal axis receivable in the attachment bore of the component and fixed to the supporting structure, said first spindle means having a longitudinally extending coaxial first threaded bore therethrough and a coaxial smooth counterbore;

second spindle means having a longitudinal axis coaxial with said first spindle means and fixed to the supporting structure and slidably engaged with the counterbore of said first spindle means, said second spindle means having a longitudinally extending, axially aligned, second threaded bore therethrough;

a first bolt having a longitudinal axis coaxial with said first and second spindle means having a longitudinally extending smooth throughbore and including:

a first head having a multifaceted recess therein;

a first end distant from said first head; and a threaded shank intermediate said first head and said first end, said threaded shank being threadedly engaged with the first threaded bore in said first spindle means, said first bolt being rotatable in one direction about said longitudinal axis to advance said first head toward the supporting structure and rotatable in the opposite direction to retract said first head from the supporting structure;

a second bolt slidably received through the throughbore in said first bolt and including:

a second head having a multifaceted recess therein;

a second end distant from said second head;

a multifaceted driver intermediate said second head and said second end operably engageable with the multifaceted recess in said first bolt; and an externally threaded shank intermediate said driver and said second end, said externally threaded shank being threadedly engaged with said second spindle means;

said first head being engageable with the component for drawing the component toward the supporting structure upon rotation of said first bolt in said one direction;

whereby upon fracture, alternatively, of said first bolt between said first head and said first end and of said second bolt between said driver and said second end, rotation of said first head in said one direction continues to advance said first head toward the supporting structure.

2. A fastener as set forth in claim 1 including:
frangible means on said second bolt intermediate said driver and said externally threaded shank for fracturing upon application to said second head of a predetermined torsional load.

3. A fastener as set forth in claim 2 wherein said frangible means includes an annular recess having a predetermined diameter.

4. A fastener as set forth in claim 1 wherein the lead and pitch of said threaded shank on said first bolt is similar to the lead and pitch of said threaded shank on said second bolt.

5. A fastener system for securing to supporting structure a component having an attachment bore extending therethrough, said fastener system comprising:
first fastener means including:
a first stationary member for attachment to the supporting structure;
first bolt means including a first head member and a first threaded shank integral with said first head member being threadedly engaged with said first stationary member, said first bolt having a longitudinally extending throughbore;
second fastener means including:
a second stationary member for attachment to the supporting structure;
second bolt means extending slidably through the throughbore in said first bolt means and including a second head member and a second threaded shank integral with said second head member engageable with the component and being threadedly engaged with said second stationary member; and
coupling means operatively engaging said first and second head members;
said second head member being operable to rotate said first and second bolt means in one direction to advance said first head member toward the supporting structure and thereby draw the component toward the supporting structure and rotatable in the opposite direction to retract said first head member from the supporting structure and thereby separate the component from the supporting structure;
whereby upon fracture, alternatively, of said first fastener means at a location away from said first head member and of said second fastener means at a location away from said second head member, upon rotation of said first head member in said one direction, said first head member nevertheless continues to advance toward the supporting structure.

6. A fastener system as set forth in claim 5 wherein said first stationary member is elongated and has a longitudinal axis and is receivable in the attachment bore of the component and has a longitudinally extending coaxial first threaded bore therethrough and a coaxial smooth counterbore;
wherein said second stationary member is elongated and has a longitudinal axis coaxial with said first stationary member and is slidably engaged with the counterbore of said first stationary member, said second stationary member having a longitudinally extending, axially aligned, second threaded bore therethrough;
wherein said first bolt means has a longitudinal axis coaxial with said first and second stationary members and a longitudinally extending smooth throughbore; and
wherein said first head member has a multifaceted recess therein;
wherein said second head member has a multifaceted recess therein; and
wherein said coupling means includes a multifaceted driver adjacent said second head member and operably engageable with the multifaceted recess in said first bolt member.

7. A fastener system as set forth in claim 6 wherein each of said first and second stationary members is cylindrical.

8. A fastener system as set forth in claim 5 including:
key means preventing relative rotation between the component and said first stationary member.

9. A fastener system as set forth in claim 6 including:
first locking means to prevent relative rotation between said first bolt means and said first stationary member; and
second locking means to prevent relative rotation between said second bolt means and said second stationary member.

10. A fastener system as set forth in claim 5 wherein said first stationary member includes:
a first cylindrical element receivable in the attachment bore of the component;
a first conical skirt member integral with and extending away from said first cylindrical element to a terminal rim; and
an annular flange integral with said terminal rim for attachment to the supporting structure; and
wherein said second stationary member includes:
a second cylindrical element receivable in the attachment bore of the component;
a second conical skirt member integral with and extending away from said second cylindrical element to a terminal rim; and
an annular flange integral with said terminal rim for attachment to the supporting structure.

11. A fastener system as set forth in claim 10 wherein said first and second conical skirt members are generally parallel and coextensive; and
wherein said annular flanges on said first and second stationary members are mutually engaged.

12. A fastener as set forth in claim 5 including:
frangible means on said second bolt means intermediate said coupling means and said second threaded shank for fracturing upon application to said second head of a predetermined torsional load.

13. A fastener as set forth in claim 12 wherein said frangible means includes an annular recess having a predetermined diameter.

14. A fastener as set forth in claim 5 wherein the lead and pitch of said threaded shank on said first bolt means is similar to the lead and pitch of said threaded shank on said second bolt means.

* * * * *